United States Patent [19]

Van Meter

[11] 4,143,844

[45] Mar. 13, 1979

[54] PIPE CLAMP

[76] Inventor: William Van Meter, 415 Perkins St., Oakland, Calif. 94610

[21] Appl. No.: 813,489

[22] Filed: Jul. 7, 1977

[51] Int. Cl.² ............................................. F16L 3/10
[52] U.S. Cl. ...................................... 248/62; 151/54; 248/DIG. 1
[58] Field of Search .................. 248/62, 49, 58, 55, 248/59, 74 R, DIG. 1, 54 R; 138/106, 107; 285/180, 187, 199; 151/54

[56] References Cited

U.S. PATENT DOCUMENTS

| 1,279,297 | 9/1918 | Drohan | 248/74 R |
|---|---|---|---|
| 1,604,590 | 10/1926 | McNulty | 248/62 X |
| 1,645,762 | 10/1927 | Lohbiller | 248/55 |
| 1,741,077 | 12/1929 | Rusack | 151/54 |
| 2,001,917 | 5/1935 | Miller | 248/58 |
| 2,352,145 | 6/1944 | Wright | 138/107 X |
| 2,373,439 | 4/1945 | Wheatley | 248/49 X |
| 2,390,838 | 12/1945 | Johnson | 151/54 |
| 3,891,006 | 6/1975 | Lee | 138/106 |
| 4,046,169 | 9/1977 | Pollone et al. | 138/106 |

FOREIGN PATENT DOCUMENTS

| 672530 | 10/1963 | Canada | 248/55 |
|---|---|---|---|
| 1312586 | 11/1962 | France | 248/74 R |

Primary Examiner—Rodney H. Bonck
Attorney, Agent, or Firm—Julian Caplan

[57] ABSTRACT

A pipe clamp used to support pipes of the type conveying dangerous materials — e.g., steam pipes in nuclear installations — especially where severe strains may be experienced — e.g., seismic conditions — is disclosed. The clamp has a yoke beam extending perpendicular to the axis of the pipe which is supported from a stationary support with an optional snubber interposed, the beam having a contact surface which fits against a portion of the pipe and a clevis or other means of attachment opposite the contact surface. The ends of the beam extend outward and have a "neutral" or "datum plane" surface tangent to the midpoint of the portion of the pipe engaged by the contact surface. Stabilizers extend axially of the pipe in either direction from the contact surface. Lugs on the pipe may be received in notches in the beam to prevent the pipe from sliding. A load bar extends around the pipe and is generally U-shaped, the ends of the bar being threaded and fitting through holes in the ends of the beam. Nuts on the ends of the bar bear against the beam at the datum plane. Preferably, a load strap of approximately the same coefficient of expansion as the pipe fits against the pipe and is slotted to receive the U-shaped portion of the load bar.

3 Claims, 7 Drawing Figures

PIPE CLAMP

This invention is, in part, the subject of Disclosure Documents Nos. 054258 and 060336.

This invention relates to a new and improved pipe clamp particularly suitable for the nuclear power industry. The clamp has a high load rating, light weight, narrow width and applies a uniform and well distributed load on the pipe wall. No thermal stress on the pipe occurs because the expansion of the load bar and pipe are matched.

In accordance with the present invention, the load bar, which is in contact with the pipe, is preferably constructed of a material having the same coefficient of expansion as the pipe and hence expands at the same rate as the pipe and stresses on the pipe wall are eliminated.

Another advantage of the invention is the fact that considerably less material is required than conventional clamps thereby reducing cost and also reducing the weight applied to the pipe, a feature which is particularly important when seismic stress has occurred.

The present invention provides for a more efficient use of material. The clamp is thinner than conventional clamps and hence it is possible to place two clamps close together and preferably at right angles to each other to absorb seismic stresses.

The yoke beam which is hereinafter described in detail is most favorable to bending properties. The load bar is under tension but the yoke beam is under both tension and compression.

A feature of the invention is the fact that the neutral plane is at the same elevation as the top of the pipe (when the clamp is disposed vertically); or in other words, it is equivalent to a datum line which is tangent to the pipe.

Another feature of the invention, due to the design of the neutral plane, is that should there be a slight mismatch of the thermal expansions of the pipe and load bar, due to slight material expansion coefficient differences or slight heat losses, a slight adjustment of the neutral plane will match these perfectly. This may also be accomplished with a spacer washer of selected material with a coefficient of expansion to suit.

Still another feature of the invention is the fact that the beam may be cut from plate, a simple machining operation.

In accordance with this invention, the load bar is preloaded to the rated load of the clamp. Thus there is no lost motion or lash arising out of separation of the clamp and pipe at the datum line.

A still further feature of the invention is the use of a load strap in contact with the pipe which is notched out for the load bar which seats therein and heat from the pipe is transferred efficiently to the load strap and then to the load bar.

In one form of the invention a stabilizer is used which serves as a moment eliminator.

Where the load angle applied to the clamp is over 30°, pipe lugs may be used on the pipe fitting into sockets or notches in the yoke beam to prevent movement of the clamp relative to the pipe.

Other objects of the present invention will become apparent upon reading the following specification and referring to the accompanying drawings in which similar characters of reference represent corresponding parts in each of the several views.

Figures 1, 2:
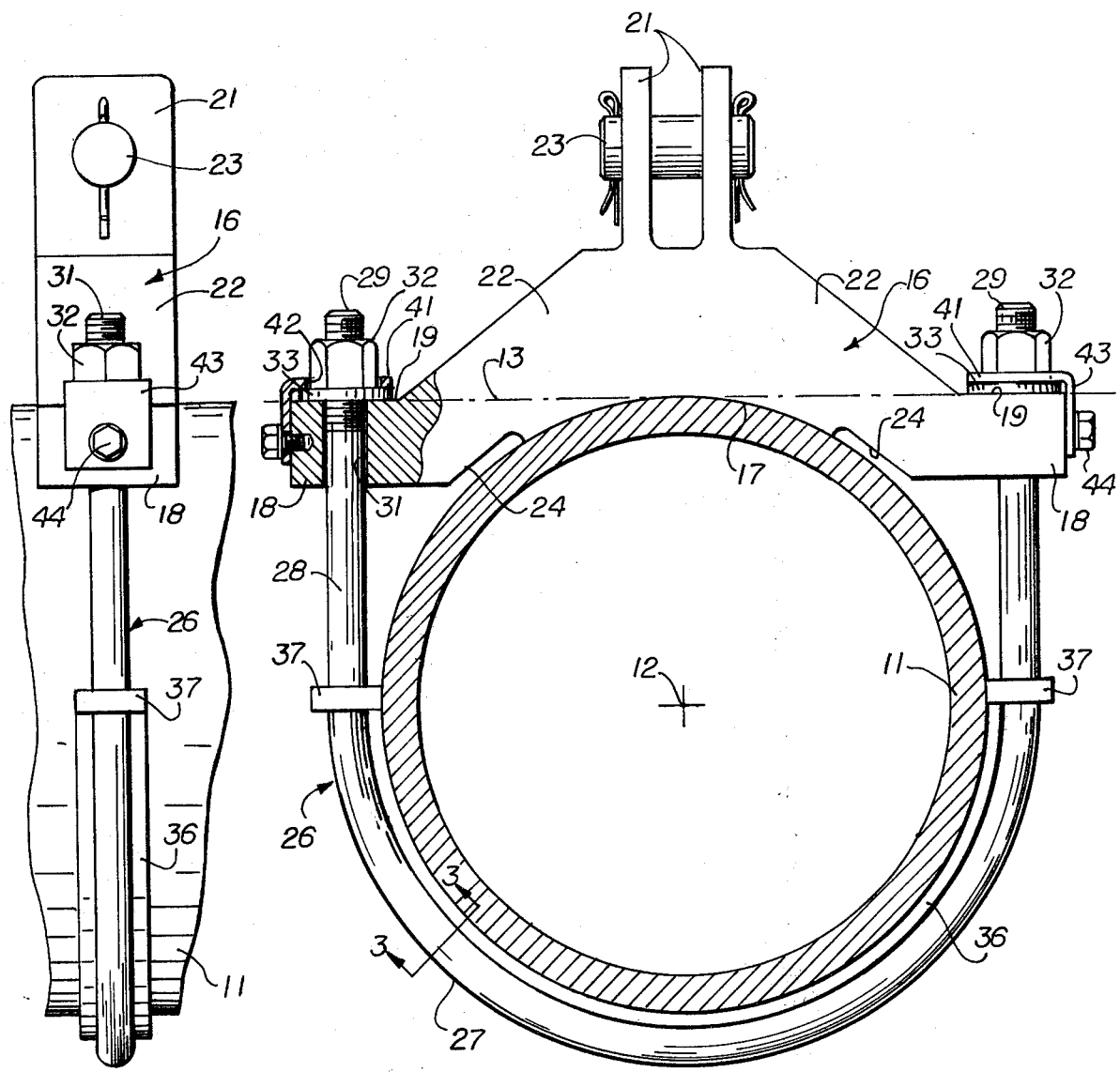
FIG. 1 is a front elevational view of a pipe clamp in accordance with one form of the present invention, the pipe being shown in section.
FIG. 2 is a side elevational view of the structure of FIG. 1.

The present invention is a clamp for pipe 11 which has a longitudinal axis indicated by reference numeral 12. The clamp hereinafter described is shown suspending pipe 11 in a vertical sense. The terms "top," "bottom," "up" and "down" are used with reference to the position of the clamp shown in the accompanying drawings. It will be understood, however, that the clamp may be disposed horizontally or one clamp may be disposed vertically and the adjacent clamp horizontally or other angles of disposition may be employed.

A datum plane 13 or neutral plane tangent to the top of pipe 11 is shown as a horizontal plane, a situation which occurs when the clamp is used to support the pipe in a vertical sense.

Yoke beam 16 is positioned on top of the pipe 11 and is preferably a plate fabricated item, the material of construction preferably having a coefficient of expansion approximately that of the pipe 11. The yoke beam has a depth, taken in a direction radially of the pipe, substantially greater than the width of said yoke beam, taken in the axial direction of the pipe, providing a tapered offset beam for moment stress distribution. Beam 16 has a contact surface 17 which is complementary to the outside diameter of the pipe 11. Extending laterally from the middle of the beam 16 are outer ends 18 and the top surfaces 19 of ends 18 are at the datum plane 13. Above the middle of the beam 16 is a clevis 21 and generous gussets 22 are formed between the clevis 21 and the ends 18. A pin 23 may extend through the clevis 21 for attachment to a snubber or other stationary support. The lower surface of the beam 16 is formed with reliefs 24 to reduce the area of contact of the surface 17 with the pipe 11.

A U-shaped clamp bar 26 has a curved portion 27 which is complementary in radius to the pipe 11 and supports the underside of the pipe. The straight ends 28 of bar 26 are formed with threads 29 on the upper end and extend through holes 31 on the outer ends 18 of beam 16. Nuts 32 are threaded onto the ends 29 with washers 33 under the nuts and bearing against the ends 18 at the datum plane 13, an important feature of the present invention.

Figure 3:
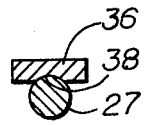
FIG. 3 is a fragmentary sectional view taken substantially along the line 3—3 of FIG. 1.

In the preferred embodiment of the invention shown in FIGS. 1 and 2, a strap 36 is positioned under the pipe 11 inside the curved portion 27. Strap 36 is preferably of a material having the same coefficient of expansion as pipe 11 and also, preferably, as bar 26. Outward extending ears 37 integral with strap 36 are apertured to receive bar 27. As is best shown in FIG. 2, the strap 36 is wider than the bar 26. Directing attention to FIG. 3, the strap 36 is formed with a groove 38 complementary to bar 27 to insure better thermal conductivity from the strap 36 to the bar 27. Accordingly, the bar 27 expands and contracts to the same degree as pipe 11.

In a preferred form of the invention shown in the accompanying drawings, a nut retainer 41 is employed having a hexagonal socket 42 which is complementary to the shape of nut 32. Thus the retainer 41 is slipped over the nut 32 when the nut has been tightened and drawn down flush with the washer 33. Flange 43 of retainer 41 lies against the outer ends of ends 18 and is held in place by screw 44. Hence once the nut has been secured and the retainer 41 applied, the nut 32 will not loosen.

Figure 4:
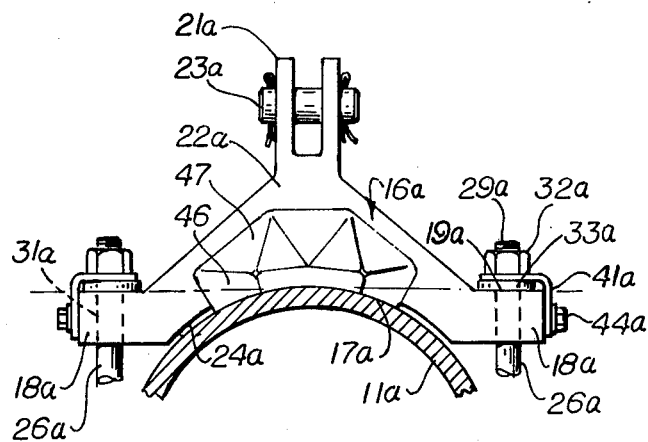
FIG. 4 is a fragmentary elevational view similar to a portion of FIG. 1 of a modification.
Figure 5:
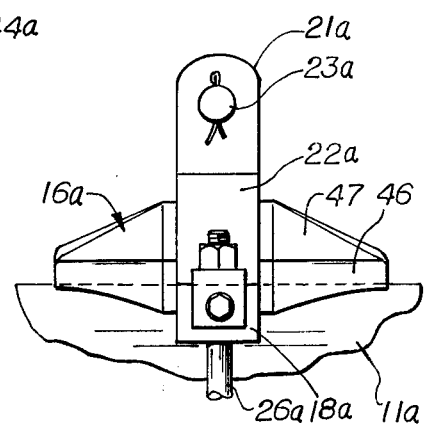
FIG. 5 is a side elevational view of the structure of FIG. 4.

IN FIGS. 4 and 5 a modification is shown, useful particularly when forces at an angle to the plane of bar 26 may be encountered. Thus stabilizers 46 extend in an axial direction relative to pipe 11 from the middle of clamp bar 26, the undersides of the stabilizers 46 being curved complementary to the shape of the top of pipe 11. Gussets 47 reinforce the stabilizers 46.

Figure 6:
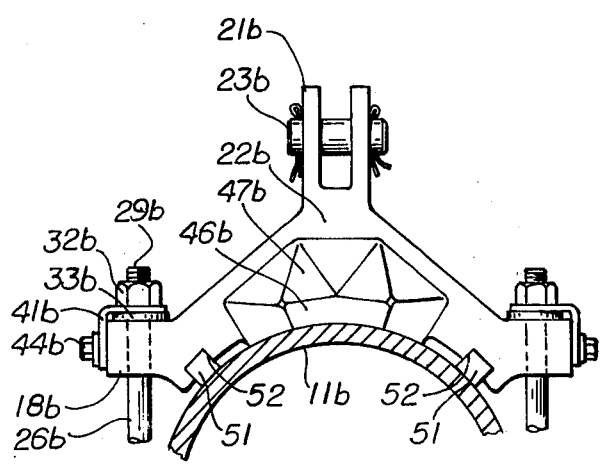
FIG. 6 is an elevational view similar to FIG. 4 of still another modification.
Figure 7:
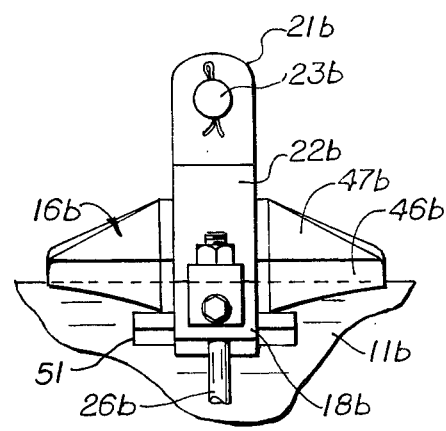
FIG. 7 is a side elevational view of the structure of FIG. 6.

In still another modification shown in FIG. 6, pipe 11b is formed with integral shear lugs 51 which are received in grooves 52 in the underside of clamp bar 26b.

In other respects, the modifications of FIGS. 4 and 5 and FIG. 6 are similar to those of the preceding modifications and the same reference numerals followed by the subscripts a and b, respectively, are used to designate corresponding parts.

What is claimed is:

1. A pipe adapted to be subjected to varying temperatures having a substantially cylindrical exterior and having a longitudinal axis and a horizontal neutral plane tangent to the top of the exterior of said pipe, and a pipe clamp for said pipe to tightly support said pipe in two opposite support directions perpendicular to said neutral plane throughout the range of said varying temperatures while allowing said pipe free thermal diametric expansion without restraining said expansion and without occurrence of thermal expansion constraint stresses in either said clamp or said pipe, said clamp comprising a yoke beam having a deep section at its midpoint extending in a direction transverse to and away from said neutral plane and to said axis, the top of said yoke beam tapering downwardly-outwardly from the middle of said yoke beam to the outer ends of said yoke beam, said outer ends being formed with apertures perpendicular to said neutral plane, said yoke beam having a concave undersurface comprising a contact surface in contact with said pipe at the middle of said yoke beam, said contact surface being substantially complementary to the exterior of said pipe and engaging said pipe at said neutral plane at the top of said pipe and for a short distance laterally of said yoke beam to either side of said middle limited by lower beam reliefs, said yoke beam having a depth substantially greater than the width of said yoke beam at said contact surface, said yoke beam comprising a tapered offset beam for moment stress distribution, said outer ends being located below said neutral plane and having top surfaces on said neutral plane, said yoke beam having support means extending from its top upward away from said neutral plane for attachment to a seismic snubber or a stationary support, a rigid U-shaped clamp bar having a curved portion in thermal transfer relation with the bottom of said pipe remote from said neutral plane and straight portions extending upward on either side of said pipe and through said apertures, the termini of said straight portions being threaded, said pipe and said clamp bar having substantially the same thermal coefficients of expansion, and nuts threaded on said termini of said straight portions applying pressure on said yoke beam at said neutral plane, said clamp bar having free thermal expansion from said top surface of said outer ends equal to the thermal diametric expansion of said pipe.

2. A pipe clamp according to claim 1 in which said clamp bar is round in cross-section and is spaced outward of said pipe and which further comprises a strap between said clamp bar and said pipe, said strap having the same curvature and thermal coefficient of expansion as said pipe, said strap having a longitudinal groove of the same curvature as the diameter of said bar, said bar fitting into said groove, said strap and said clamp bar being shaped for extended close contact whereby heat transmitted from said pipe to said strap is efficiently transmitted to said clamp bar whereby thermal diametric expansions of said strap, said pipe and said clamp bar match at their contact surfaces and said constraint stress is eliminated.

3. A clamp according to claim 1 which further comprises a pair of support moment stabilizers extending from said yoke beam in opposite directions axially of said pipe, the length of each said stabilizer being not less than the width of said yoke beam, and having stabilizer contact surfaces to engage the outside of said pipe at said neutral plane and laterally to either side of the middle of said yoke beam, each said stabilizer tapering downwardly-outwardly from said yoke beam to form a double-tapered cantilever beam for moment stress distribution.

* * * * *